(12) United States Patent
Goertz et al.

(10) Patent No.: US 6,169,131 B1
(45) Date of Patent: *Jan. 2, 2001

(54) CONSTRUCTION SHEETING

(75) Inventors: Henricus J. J. Goertz; Richerdes J. M. Hulskotte, both of Schinnen; Reinoldus J. M. Borggreve, Hulsberg, all of (NL)

(73) Assignee: DSM N.V., Heerlen (NL)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/100,958

(22) Filed: Jun. 22, 1998

Related U.S. Application Data

(63) Continuation of application No. PCT/NL96/00492, filed on Dec. 20, 1996.

(30) Foreign Application Priority Data

Dec. 22, 1995 (NL) ........................................... 1001978

(51) Int. Cl.⁷ .............................. B32B 27/36; E04D 5/06
(52) U.S. Cl. ...................... 524/101; 524/100; 525/443; 528/301; 428/480
(58) Field of Search ................................. 524/101, 100; 525/443; 528/301; 428/480

(56) References Cited

U.S. PATENT DOCUMENTS

| | | |
|---|---|---|
| 3,660,344 | 5/1972 | Dietrich et al. |
| 4,725,481 * | 2/1988 | Ostapchenko .................. 428/213 |
| 5,135,974 * | 8/1992 | Moore .................................. 524/101 |

FOREIGN PATENT DOCUMENTS

| | | |
|---|---|---|
| 265 922 | 5/1988 | (EP) . |
| 708 212 | 4/1996 | (EP) . |
| 0 827 561 B1 | 3/1998 | (EP) . |
| 51-111290 * | 10/1976 | (JP) . |
| 02088668 * | 3/1990 | (JP) . |
| 04090337 * | 3/1992 | (JP) . |

OTHER PUBLICATIONS

Database WPI, Week 7646, Derwent Publications Ltd., AN 76–86050x XP002010816 & JP 51 111 290 A, Oct. 2, 1976.
Database WPI, Week 9219, Derwent Publications Ltd., AN 92–154500, XP002010817 & JP 04 090 337 A, Mar. 24, 1992.
Database WPI, Week 9019, Derwent Publications Ltd., AN 90–143178, XP002010818 & JP 02 088 668 A Mar. 28, 1990.

* cited by examiner

*Primary Examiner*—Patricia A. Short
(74) *Attorney, Agent, or Firm*—Pillsbury Madison & Sutro LLP Intellectual Property Group

(57) ABSTRACT

The invention relates to a plastic sheeting which is suitable, in particular, for application in the construction industry.

It is obtained by employing polyetherester block copolymers and has good humidity-regulating properties and water impermeability. Flame retardancy in accordance with DIN 4102 B2 is obtained by employing melamine, melamine compounds or melamine condensates in the polyetherester composition for the sheeting.

14 Claims, No Drawings

CONSTRUCTION SHEETING

This is a Continuation of: International Appln. No. PCT/NL96/00492 filed Dec. 20, 1996 which designated the U.S.

The invention relates to a plastic sheeting for use in the construction industry. Examples of such a sheeting are a sheeting based on a polyolefin, for example polyethylene, which is used, in particular, as a temporary provision against rain and wind for buildings still under construction, and sheeting based on poly(vinylchloride), which is used, in particular, as a damp-proof course above, for example, window and door frames and adjacent brickwork and, often reinforced by a woven, as a roofing material. These known sheetings have the drawback, however, that their permeability to water vapour is very poor, as a result of which it is virtually impossible to control humidity, and condensation and rot may occur. To counter this drawback, the sheeting is perforated in some cases. This additional treatment, however, adversely affects the tear strength of the sheeting and may locally result in small leaks.

EP-A-167714 and JP-A-0490337 disclose plastic sheeting for the construction industry which is permeable to water vapour. The plastics selected in these publications are polyetheramide and polyesterester block copolymers, the polyetheramide block copolymer being able to retain more than its own weight in water. The use of these known water vapour-permeable plastic sheetings encounters a number of drawbacks, however. Thus the polyether-amide block copolymer sheeting has virtually no mechanical strength once it has absorbed water, and its rate of production is limited by the limited crystallinity and crystallization rate of the polyetheramide block copolymer. Because of this and also because of the higher price of the starting material, the sheeting is relatively expensive. Sheets of polyesterester block copolymers have the major drawback that they are not suitable for long-term use in a humid environment, owing to the polyesterester block copolymer being highly sensitive to hydrolysis which, inter alia, causes a rapid fall-off in strength.

An object of the invention is therefore a water-impermeable, yet water vapour-permeable plastic sheeting, which does not have the above-mentioned drawbacks and is suitable for use in the construction industry.

This object has been achieved by means of a plastic sheeting made of a polyetherester block copolymer.

Polyetherester block copolymers are thermoplastic copolymers having elastomeric characteristics, the copolymer being composed of hard, readily crystallizable segments and of soft or elastomeric segments, of which the currently most common can be described by the following general formulae:

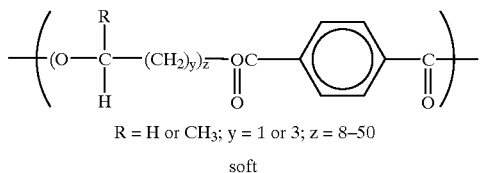

R = H or CH₃; y = 1 or 3; z = 8–50 soft

-continued

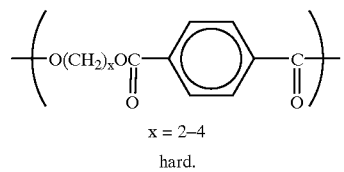

x = 2–4 hard.

The hard segments preferably comprise alkylene terephthalate units, but it is also possible for units derived from other aromatic dicarboxylic acids, for example naphthalenedicarboxylic acid, p-diphenyldicarboxylic acid and isophthalic acid to be present in the hard segments. Examples of alkylenediols are ethylene glycol, propylene glycol, butylene glycol or hexylene glycol, but it is also possible for the glycol of butene to be used for the preparation of the esters for the hard segment.

The soft segments are generally poly(alkylene oxides) esterified with terephthalic acid. Here, too, it is possible for other aromatic acids to be used. Preference is given to the use of poly(propylene oxide) or poly(tetramethylene oxide). It is possible for ethylene oxide units to be incorporated in minor amounts, i.e. less than 50 mol %, preferably less than 30 mol %, in the poly(alkylene oxide) segments, for example by employing polypropylene oxide chains terminated with ethylene oxide.

A comprehensive description of polyetherester block copolymers and their preparation can be found in Encyclopedia of Polymer Science and Technology, Volume 12, pages 76–177 (1985) and the references reported therein.

Various polyetherester block copolymers are commercially available from a number of companies under various tradenames, for example ARNITEL E and P of DSM, the Netherlands, HYTREL of E.I. Du Pont De Nemours, USA, and LOMOD of General Electric Plastics, USA.

Varying the ratio hard/soft segment and using different alkylene oxides and molar weights of the soft segments makes it possible to obtain block copolyesters having different hardnesses, for example between Shore D 30 and 80. Preferably, polyetherester block copolymers having a Shore D hardness between about 35 and 60 are employed for the sheeting according to the invention. Block copolymers whose hardness is too low often have less good processing characteristics into sheeting, owing to the relatively low crystallinity and crystallization rate. At higher hardnesses, the bending strength and the water vapour permeability decrease unduly.

Depending on the desired pattern of characteristics, those skilled in the art will be able to select the correct polyetherester block copolymer for the sheeting according to the invention.

The polyetherester block copolymer of the sheeting may contain the usual additives, for example stabilizers, dyes or pigments, fillers, processing aids, for example release agents, etc.

For most applications it is necessary for the sheeting according to the invention to satisfy the nonflammability requirements imposed by the authorities. A requirement often applicable to construction sheeting is the DIN 4102 B2 classification. This involves a sheet being suspended vertically and a specified Bunsen burner having a flame length of 20 mm being directed, at an angle of 45 degrees, against the edge or the surface of the sheet. The flame is held against the sheet for 15 seconds, after which the burn time until the flame tip reaches a mark (150 mm above the flame application point) is measured. If this burn time is 20 seconds or longer (measured on 5 samples), the B2 classification is complied with.

Known flame retardants for use in construction sheeting are combinations of a halogenated organic compound with antimony oxide, as reported, for example, in EP-A-0109928. Quite apart from the drawbacks, corrosivity and potential toxicity, this combination proves unable, according to the invention, even at a high concentration in the sheeting, to conform with DIN 4102 B2. Other known flame retardants for sheeting are metal hydroxides, for example alumina trihydrate and magnesium hydroxide in high concentrations, 60–80 wt %, see U.S. Pat. No. 4,851,463. Owing to the high concentration required of these inorganic materials in the sheeting, the mechanical characteristics are significantly impaired, which means that the use thereof must be avoided.

Most surprisingly, the inventors have found that the use of melamine, melamine compounds, for example melamine cyanurate, and melamine condensation products, for example melam, in the sheeting results in a flame retardancy which meets the B2 classification. The use of melamine cyanurate in flame-retarding compositions for polyetherester copolymers is known. JP-A-2-88668 discloses that melamine cyanurate, if added in very low concentration to the commonly used halogenated organic flame retardant, enhances its effectiveness. In a comparative experiment it is shown that the effect of the use of melamine cyanurate as the only flame retardant is negligable.

The content of melamine, melamine compound or melamine condensation product in the sheet is between 7 and 30 wt %, based on the polyetherester copolymer. Preferably, the content is between 9 and 25 wt %. The content is primarily determined by the desired level of flame retardancy and depends, inter alia, on the thickness of the sheet.

In the case of very thin films for instance <50 $\mu$m, a content of 5 wt. % may already suffice to fulfill the DIN 4102 B2 requirement. However the reinforcing backing and/or additives adversely influence the flame retarding so that higher contents, >7 wt. %, are preferred.

The particle size of the flame-retarding compound is preferably chosen to be as small as possible, preferably <50 $\mu$m, more preferably <20 $\mu$m. The best results are achieved with a particle size of <10 $\mu$m.

If required, it is additionally possible to use, in the composition of the flame-resistant sheeting according to the invention, a minor amount of a compound which enhances the flame-retarding effect. Preferably, such a compound is chosen from the group of compounds which, in the event of a fire, do not produce corrosive and/or toxic gases. Examples of such compounds are polymers derived from aromatic compounds, for example novolaks and polyphenylene ethers, metal compounds, for example oxides, borates or oxalates, and organic phosphorus-containing compounds. Preferably, the content of these compounds which enhance the flame-retarding effect is smaller than 50 wt %, based on the melamine, the melamine compound or the melamine condensate.

In general, melamine will be used only in the case of sheeting containing a polyetherester copolymer having a low melting point, preferably in the order of 200° C. or less. In the case of higher melting points and concomitantly necessary processing temperatures it is possible for fouling of the processing equipment and "bleeding" of melamine to the surface of the sheeting to occur, as a result of the relatively high volatility of melamine. The use of melamine cyanurate or melam is therefore to be preferred.

The flame retardant sheeting according to the invention is obtained by methods known per se from the copolyetherester composition. The copolyetherester composition is generally obtained by melt blending of the polyetherester block copolymer with the melamine, melamine cyanurate or melamine condensate and, if required, other additives, for example stabilizers. Said melt blending can take place in the customary melt blending equipment, the use of a blending extruder, preferably a twin-screw extruder, being preferable to obtain good dispersion of the flame retardant in the composition. Then the granules obtained after the blending extrusion step are processed in the customary film and sheet production equipment to give the sheeting of the desired thickness, use being made, in general, of sheet extrusion equipment.

The sheet may have any thickness required, for example between 20 $\mu$m and a few mm. Preferably the thickness of the sheet is less than 1 mm, more preferably less than 0.75 mm, most preferably less than 0.5 mm, to be effective as a water-vapour permeable medium. The very thin sheeting is generally used in combination with one or more other porous supports which are to ensure the mechanical strength, such as described, for example, in JP-A-0490337.

If required, the sheeting is used in combination with a fibrous material which is to ensure the required strength. Examples of such fibrous materials are organic fibres, for example polyester fibres or fibres of aromatic or aliphatic polyamides, and inorganic fibres, for example glass fibre. Said fibrous material may be present in the form of a woven or as a staple fibre web. The fibre-reinforced sheeting can be obtained, for example, by coextrusion of the woven or the staple fibre web with the copolyetherester, or by means of compression-moulding the fibre structure with the polyetherester sheeting.

In addition the sheeting may contain various additives to improve the colour and the appearance.

The sheeting according to the invention can be used in highly diverse ways, for example as a component of a roof covering or as an underlay therefor, as protective sheeting above wooden subassemblies, for example door and window frames, as sheeting to drain away any rainwater or condensation water which has penetrated a cavity wall, as a seal between adjoining brickwork, as a wall covering, in which case the accompanying qualities such as elasticity and "soft touch" can be utilized in particular, and many other uses in the construction industry where the qualities of humidity control and water impermeability matter.

Although, for the time being, the main applications of the sheeting are to be found within the construction industry, applications outside this sector can also be indicated, for example in furniture upholstery, where good humidity regulation is one of the factors defining comfort and there are requirements regarding flame retardancy.

The invention is now explained in more detail with reference to the following examples, without, however, being limited thereto.

Materials used:

Arnitel EM 400®: from DSM, the Netherlands; a polyetherester block copolymer containing polybutylene terephthalate as hard segments, and soft segments of polytetramethylene oxide, Shore D hardness=40.

Arnitel PM 380®: from DSM, the Netherlands; a polyetherester block copolymer containing polybutylene terephthalate as hard segments, and soft segments of polypropylene oxide/ethylene oxide 60/40, Shore D hardness=38.

Melamine: from DSM, particle size $d_{99}$<50 µm

Melamine cyanurate (Mecy): from DSM, aver. particle size 50%<2 µm

F-2400®: from Dead Sea Bromine, Israel, Br-epoxy polymer compound containing 52 wt % of Br, M=approx. 60,000.

$Sb_2O_3$: an 80 wt % masterbatch in PBT, from Campine.

Spinflam MF83®: from Himont, P- and N-containing intumescent flame retardant based on a piperazine salt.

CDP: from MFC, cresyl diphenyl phosphate

Chimasorb 944®: from Ciba Geigy, a UV stabilizer based on a hindered amine oligomer.

EXAMPLES I AND II, EXPERIMENTS A–E

Arnitel PM 380, after drying, was blended in a ZSK 30/33 D twin-screw extruder with the flame retardants listed in Table 1. Screw speed 200 rpm, throughput 10 kg/h, melt temperature 245° C. The granulate obtained was extruded, to produce a film having a thickness of 0.4 mm, on a Battenfeld 45 mm film extruder at a melt temperature of 216° C. and a roller temperature of about 20–25° C. and a rolling speed of 3.13 m/min.

The water vapour permeability, the water absorption after 3 days' immersion in water at 25° C., and flame retardancy according to DIN 4102 B2 of this film were determined.

The results of these tests are shown in Table 1.

+ means "meets the requirements for roofing sheeting".
++ means "amply meets the requirements for roofing sheeting". "N" is below standard.

EXAMPLE III

Example II is repeated, except that 50% of the melamine cyanurate is replaced by melamine. This composition likewise is found to meet DIN 4102 B2.

EXAMPLES IV AND V

Examples I and II were repeated, except that Arnitel EM 400 was used instead of Arnitel PM 380.

EXAMPLES VI, VII AND VIII

The compositions of Ex. I and IV and V were additionally admixed with 0.5 wt % of Chimasorb 944 FL, and the stability of the sheeting when subjected to UV light was determined by means of an Atlas UVCON apparatus comprising a UV-B313 nm lamp with an exposure, each time, of 4 hours at 60° C., and 4 hours' condensation at 50° C. The breaking elongation of the film was determined by means of a Zwick 1445 instrument, drawing speed 50 mm/min, on an ISO 237 tension test bar ($L_0$=12 mm, $b_0$=2 mm). The results are reported in Table 2.

TABLE 1

|  | Exp. A | B | C | D | E | Exa. I | Exa. II | Exa. IV | Exa. V |
|---|---|---|---|---|---|---|---|---|---|
| Arnitel PM 380 | 93*) | 86 | 78.75 | 85 | 95 | 100 | 90 |  |  |
| Arnitel EM 400 |  |  |  |  |  |  |  | 100 | 90 |
| Mecy |  |  |  |  |  |  | 10 |  | 10 |
| F-2400 |  | 5 | 10 | 15 |  |  |  |  |  |
| $Sb_2O_3$ |  | 2 | 4 | 6.25 |  |  |  |  |  |
| Spinflam MF 83 |  |  |  |  | 15 |  |  |  |  |
| CDP |  |  |  |  |  | 5 |  |  |  |
| water absorption [%] |  |  |  |  |  | 1.9 | 1.7 | 0.75 | 0.70 |
| water vapor permeability |  |  |  |  |  | ++ | ++ | + | + |
| DIN 4102 B2 | N | N | N | N | N | N | complies | N | complies |

*) composition in parts by weight

TABLE 2

| Arnitel EM 400 | 100 | 99.5 | 89.5 |  |
|---|---|---|---|---|
| Arnitel PM 380 |  |  |  | 99.5 |
| Mecy |  |  | 10 |  |
| 0.5 wt % of Chimasorb |  | 0.5 | 0.5 | 0.5 |
| Ageing *) [hours] | 95 | >200 | >200 | 95 |

*) The measure chosen for ageing under UV light is the time until the breaking elongation has decreased to 250%.

What is claimed is:

1. A water-impermeable, water-vapor permeable plastic sheeting for use in the construction industry, said sheeting comprising
   a) a single water-impermeable, water-vapor permeable layer of a copolyether ester, and
   b) optionally one or more porous support layers, wherein said copolyether ester consists of hard segments derived from aromatic dicarboxylic acids and alkylene diols, and
   soft segments derived from ethylene oxide-terminated polypropylene oxides containing less 50 mol % ethylene oxide units.

2. Plastic sheeting according to claim 1, wherein said aromatic dicarboxylic acids are at least one member chosen from the group consisting of iso- and terephthalic acid, naphthalenedicarboxylic acids and p-diphenyldicarboxylic acids.

3. Plastic sheeting according to claim 1, wherein said ethylene oxide-terminated polypropylene oxides contain less than 30 mol ethylene oxide.

4. Plastic sheeting according to claim 1, wherein said copolyether ester has a Shore D hardness of between 30 and 80.

5. Plastic sheeting according to claim 1, wherein said copolyether ester layer contains 7–30 wt %, based on the copolyether ester, of one or more substances chosen from the group consisting of melamine, melamine compounds and melamine condensates, and wherein said copolyether ester layer contains no halogenated flame-retardant additives.

6. Plastic sheeting according to claim 5, wherein the melamine compound is melamine cyanurate.

7. Plastic sheeting according to claim 1, wherein the copolyether ester layer contains a UV stabilizer.

8. Roofing construction comprising a water-impermeable water-vapor permeable plastic sheeting, said sheeting comprising
   a) a single water-impermeable, water-vapor permeable layer of a copolyether ester, and
   b) optionally one or more porous support layers, wherein said copolyether ester consists of hard segments derived from aromatic dicarboxylic acids and alkylene diols, and
   soft segments derived from ethylene oxide-terminated polypropylene oxides containing less than 50 mol % ethylene oxide units.

9. Roofing construction according to claim 8, wherein said aromatic dicarboxylic acids are at least one member chosen from the group consisting of iso- and terephthalic acid, naphthalenedicarboxylic acids and p-diphenyldicarboxylic acids.

10. Roofing construction according to claim 8, wherein said ethylene oxide-terminated polypropylene oxides contain less than 30 mol % ethylene oxide.

11. Roofing construction according to claim 8, wherein said copolyether ester layer contains 7–30 wt %, based on the copolyetherester, of one or more substances chosen from the group consisting of melamine, melamine compounds and melamine condensates, and wherein said copolyether ester layer contains no halogenated flame-retardant additives.

12. Roofing construction according to claim 11, wherein the melamine compound is melamine cyanurate.

13. Roofing construction according to claim 8, wherein said copolyether ester has a Shore D hardness of between 30 and 80.

14. Roofing construction according to claim 8, wherein said copolyether ester layer contains a UV stabilizer.

* * * * *